(12) United States Patent
Yoshida

(10) Patent No.: US 7,143,309 B2
(45) Date of Patent: Nov. 28, 2006

(54) INFORMATION STORAGE APPARATUS THAT CAN RELOCATE DATA TO BE STORED IN DEFECTIVE SECTORS

(75) Inventor: Osamu Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 652 days.

(21) Appl. No.: 10/658,600

(22) Filed: Sep. 9, 2003

(65) Prior Publication Data

US 2004/0128581 A1    Jul. 1, 2004

(30) Foreign Application Priority Data

Sep. 10, 2002    (JP) .............................. 2002-264262

(51) Int. Cl.
*G06F 11/00* (2006.01)
(52) U.S. Cl. ............................ 714/8; 714/54; 714/710; 369/47.14; 365/200; 365/201
(58) Field of Classification Search .................... 714/8, 714/54, 710; 369/47.14
See application file for complete search history.

(56) References Cited

U.S. PATENT DOCUMENTS 5,844,911 A * 12/1998 Schadegg et al. ........... 714/710
6,301,644 B1 * 10/2001 Andoh et al. ............... 711/201
6,728,899 B1 * 4/2004 Ng et al. ........................ 714/8
6,868,511 B1 * 3/2005 Ko .............................. 714/710

FOREIGN PATENT DOCUMENTS

| JP | 9-35418 | 2/1997 |
| JP | 2000-149403 | 5/2000 |

* cited by examiner

*Primary Examiner*—Robert W. Beausoliel
*Assistant Examiner*—Emerson Puente
(74) *Attorney, Agent, or Firm*—Greer, Burns & Crain, Ltd

(57) ABSTRACT

An information storage apparatus includes a recording medium having a user region including user sectors, an alternative region having alternative sectors, and a preparatory region provided in the front of the user region, having preparatory sectors that are used when the user sectors and the alternative sectors are relocated. The preparatory region and the user region are provided in this order, and the user data of posteriori defective sectors are stored in the alternative sectors. Since the user sectors and the alternative sectors are rearranged over the preparatory region and the user region in the order of logical block addresses, the seek operations of the head can be minimized, and the transfer rate can be improved.

8 Claims, 10 Drawing Sheets

| LBA | ILBA BEFORE RELOCATION PROCESSING | ILBA AFTER RELOCATION PROCESSING |
|---|---|---|
| 00 | 08 | 06 |
| 01 | 09 | 07 |
| 02 | ALN00 | 08 |
| 03 | 12 | 09 |
| 04 | 14 | 12 |
| 05 | ALN01 | 14 |
| 06 | 16 | 16 |
| 07 | 17 | 17 |
| 08 | 18 | 18 |
| 09 | 19 | 19 |

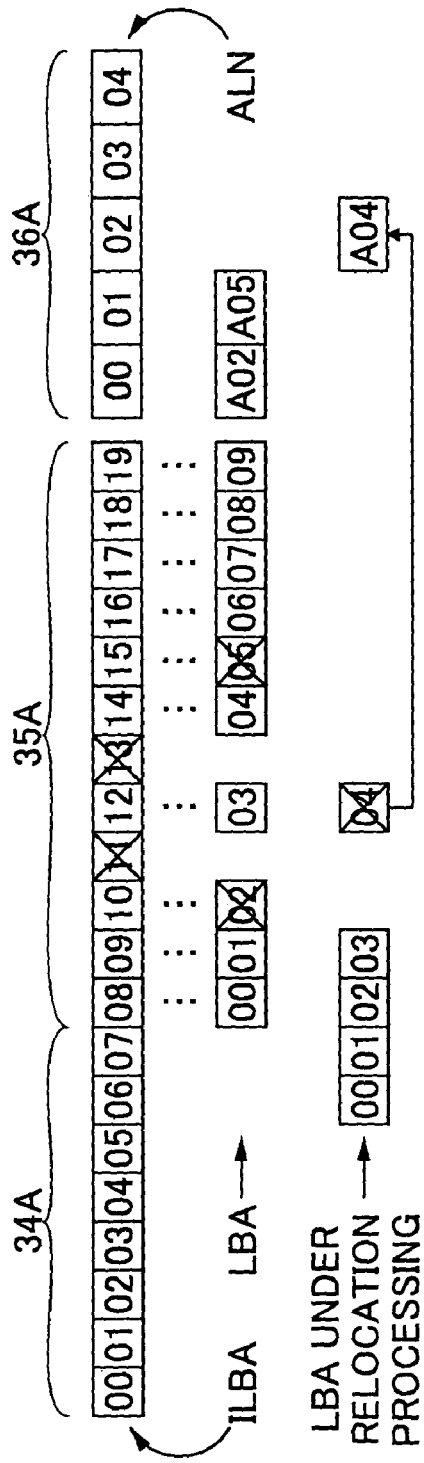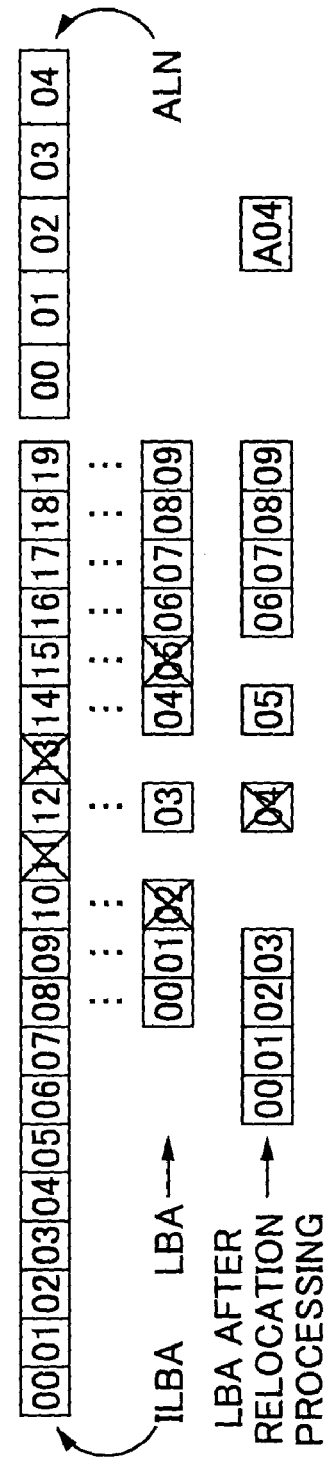
FIG.7A
FIG.7B

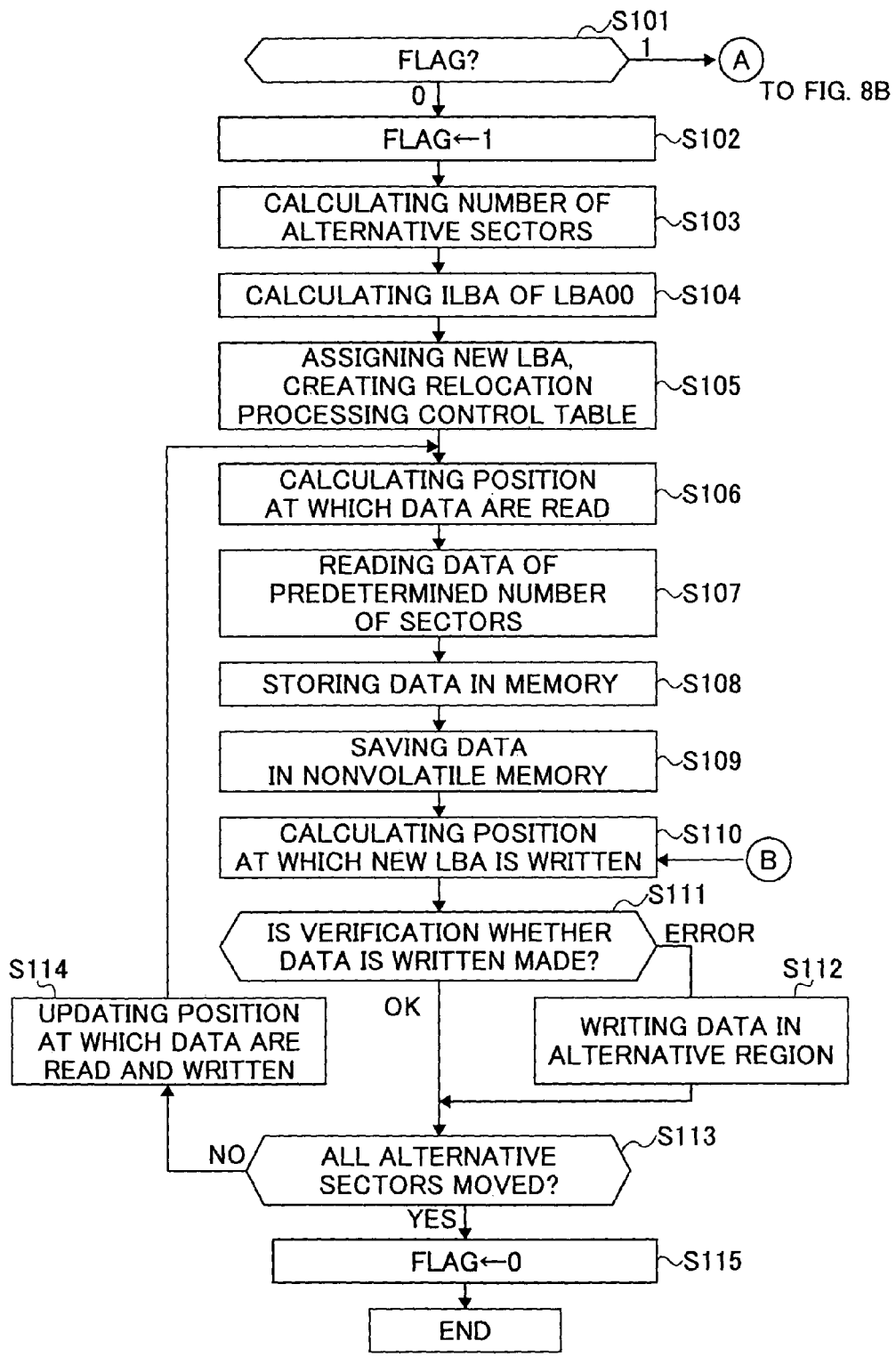

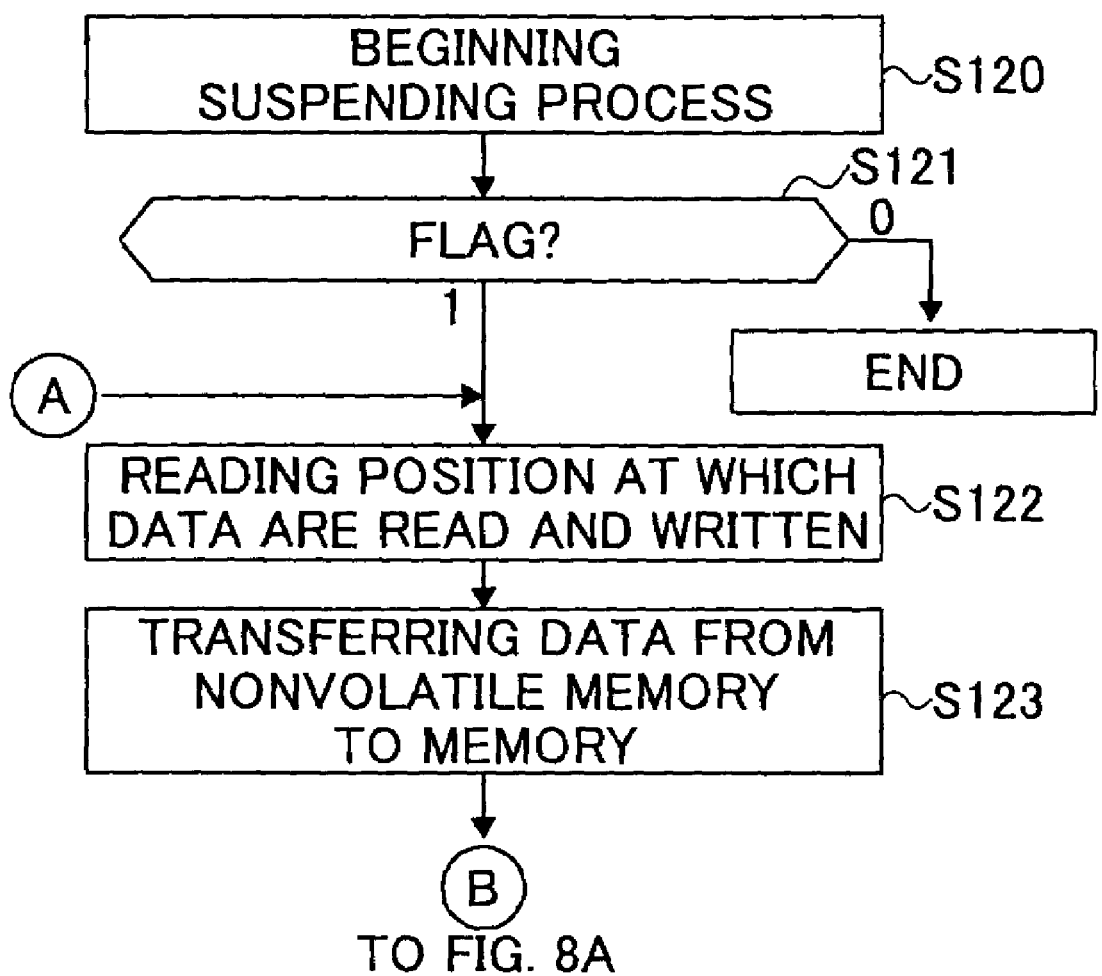

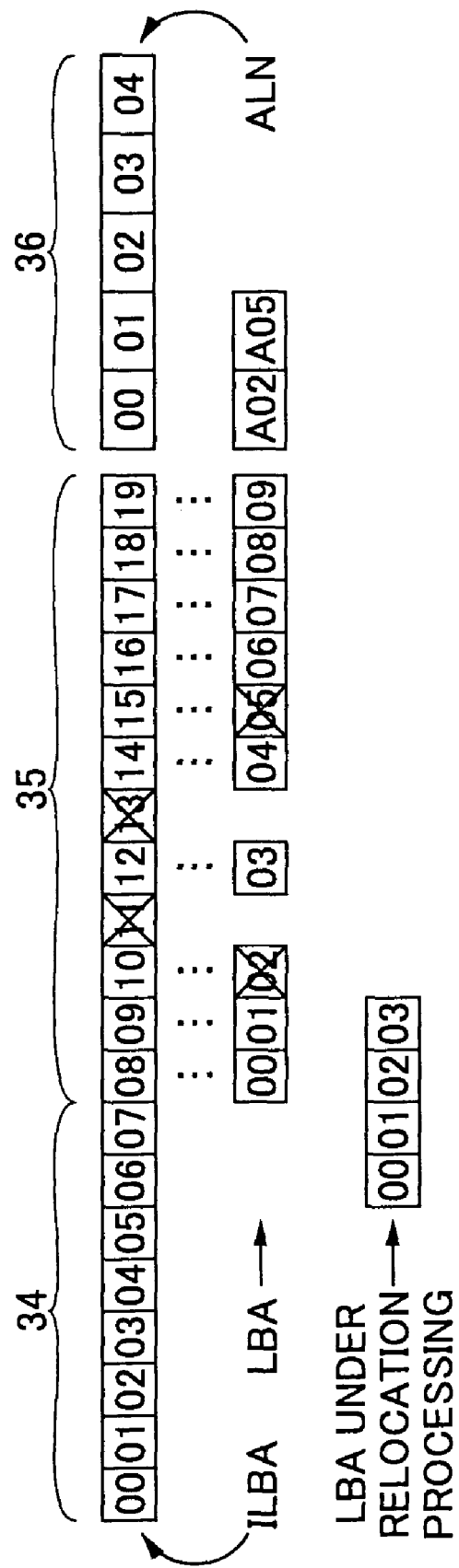

INFORMATION STORAGE APPARATUS THAT CAN RELOCATE DATA TO BE STORED IN DEFECTIVE SECTORS

BACKGROUND OF THE INVENTION

1. Field of the Invention

The present invention generally relates to an information storage apparatus such as a magnetic disk apparatus and an optical disk apparatus, and more particularly, to an information storage apparatus that can relocate data stored in posteriori defective sectors so as not to lose the data, without lowering data transfer speed, and a method of relocating the data.

An information storage apparatus is inspected before shipment from a factory. If any defective sector is found in the information storage medium of the information storage apparatus, the information storage apparatus is programmed not to write data in the defective sector. Data are automatically stored only in good sectors.

After the shipment from the factory, however, some good sectors may be damaged while in use. The information storage apparatus relocates data stored in the posteriori defective sectors to alternative sectors so as not to lose the data.

2. Description of the Related Art

The market for audio visual apparatuses that use disk-type information storage apparatuses such as hard disk drives and rewritable optical disk drives is expanding.

A hard disk drive, for example, is inspected when it is initialized in its manufacturing process. If any initial defective sector is found, the positional information of the initial defective sector is recorded in a particular area of the magnetic disk of the hard disk drive.

Logical block addresses (LBAs) are assigned from the top sector of the user data area, but the initial defective sectors are skipped based on the positional information. The hard disk drive writes and reads data using the logical block address as an identifier. In addition, since the hard disk drive needs a large enough number of sectors, backup sectors are additionally prepared on the magnetic disk.

It is possible to avoid using the initial defective sectors because the logical block addresses are assigned only to good sectors other than the initial defective sectors. The logical block addresses are assigned so that the seek time and rotational delay time of a magnetic head are minimized. The data transfer speed of the hard disk drive is consequently improved.

On the other hand, if any good sector is damaged after shipment, data stored in the damaged sector (posteriori defective sector) are relocated to a backup sector, and the backup sector is used on behalf of the posteriori defective sector. Accordingly, it is possible to prevent the posteriori defective sectors from being used and to improve the reliability of the hard disk drive.

By the way, even if some good sectors are damaged and backup sectors are accessed on their behalf, it is desired that the data transfer speed not be lowered. The assignment of the logical block addresses needs to be modified so that the data transfer speed is not lowered. If the data transfer speed is lowered, various problems may occur. For example, a motion picture that is played may stop momentarily.

The assignment of the logical block addresses is changed in the entire region in which user data are stored. New posteriori defective sectors may be found during the change. In addition, the user data may be lost due to power failure.

SUMMARY OF THE INVENTION

Accordingly, it is a general object of the present invention to provide a novel and useful information storage apparatus in which one or more of the problems described above are eliminated.

Another and more specific object of the present invention is to provide an information storage apparatus that can reliably reassign logical block addresses to good sectors in an alternative region and a user region, and a reliable method of reassigning the logical block addresses.

According to an aspect of the present invention, an information storage apparatus comprising a recording medium includes: a user region having user sectors, logical block addresses being assigned thereto, in which user data are stored; an alternative region having an alternative sector, in which user data of a posteriori defective user sector are stored; and a preparatory region provided in a front side of said user region, having preparatory sectors that are used when the user sectors and the alternative sectors are relocated, wherein the user sectors storing user data of the posteriori defective user sector in the user region and the user sectors other than the posteriori defective user sector are relocated over the preparatory region and the user region in an order of the logical block addresses; and the user data are moved to the relocated sectors.

The preparatory region and the user region according to the present invention are provided in this order. The alternative region is separate from the preparatory region. The user data of posteriori defective sectors whose damage occurs after shipment from a factory are stored in the alternative sectors in the alternative region. Since the user sectors and the alternative sectors are rearranged over the preparatory region and the user region in the order of the logical block addresses, the seek operation of the head can be minimized, and the transfer rate can be improved. Additionally, since the user data to be relocated are written in sectors in front of the sectors in which the user data have been stored, even if writing operation is suspended due to power failure, for example, the user data are still retained in the information storage medium. Accordingly, even in this case, it is possible to recover the user data and resume the relocating processing. The information storage apparatus becomes safe, reliable, and efficient.

The alternative region may be provided continuous to the user region. In the case that the alternative region is provided near to the user region, if the user data of posteriori defective sectors are moved to the alternative sectors, the head can still access the alternative sectors quickly, which prevents the transfer rate from being degraded.

According to another aspect of the present invention, a method of relocating sectors of an information recording medium includes: a user region having user sectors, logical block addresses being assigned thereto, in which user data are stored; an alternative region having alternative sectors, in which user data of posteriori defective user sectors are stored; and a preparatory region provided at the front side of said user region, having preparatory sectors that are used when the user sectors and the alternative sectors are relocated, comprising the steps of: (1) counting the number of the alternative sectors; (2) assigning new logical block addresses to sectors starting with a sector of the counted number in front of the top (the start) of the user region, the posteriori defective sectors being skipped; (3) reading user data stored in sectors of a predetermined number in the direction in which the logical block addresses increase; (4) writing the user data read in the step (3) in a direction in which the new logical block address increases; and (5) repeating steps (3) and (4) until the user data of all alternative sectors are moved.

The preparatory region and the user region according to the present invention are provided in this order. Since the user sectors and the alternative sectors are rearranged over the preparatory region and the user region in the order of the logical block addresses, the seek operation of the head can be minimized, and the transfer rate can be improved. Additionally, since the user data to be relocated are read from the user sectors or the alternative sectors of a predetermined number and are written in sectors in front of the sectors in which the user data have been stored, even if writing operation is suspended due to power failure, for example, the user data are still retained in the information storage medium. Especially, if the predetermined number is determined not to exceed the number of the alternative sectors, all user data are retained in the information storage medium. It is not necessary to save the user data in a separate nonvolatile memory. The capacity of the separate nonvolatile memory can be saved. Accordingly, even in this case, it is possible to recover the user data and resume the relocating processing. The information storage apparatus becomes safe, reliable, and efficient.

Other objects, features, and advantages of the present invention will be more apparent from the following detailed description when read in conjunction with the accompanying drawings.

BRIEF DESCRIPTION OF THE DRAWINGS

FIG. 6 is a relocation control table according to an embodiment;

FIGS. 7A and 7B are schematic diagrams showing the relationship between logical block addresses and ideal logical block addresses that are assigned in the case that an error occurs during relocating processing according to an embodiment;

FIG. 8A is a flow chart showing the steps of relocating processing according to an embodiment;

FIG. 8B is a flow chart showing the steps of suspending processing in the case that relocating processing is suspended, according to an embodiment; and FIG. 9 is a schematic diagram showing sectors in the case that relocating processing is suspended according to an embodiment.

DETAILED DESCRIPTION OF THE PREFERED EMBODIMENTS

A magnetic disk apparatus according to a preferred embodiment of the present invention will be described with reference to the drawings.

Figure 1:
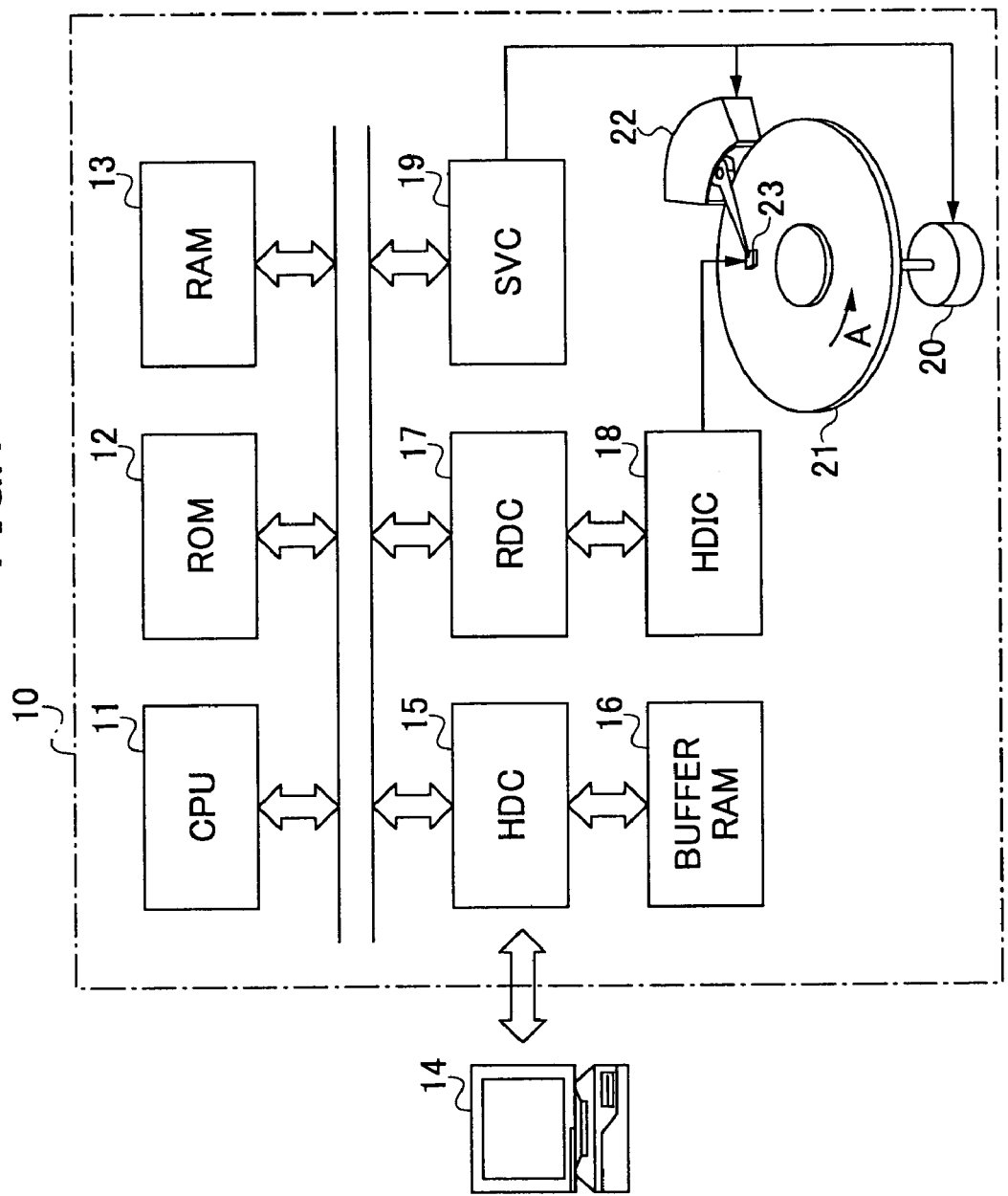
FIG. 1 is a block diagram showing a magnetic disk apparatus according to an embodiment of the present invention.

FIG. 1 is a block diagram showing a magnetic disk apparatus according to an embodiment of the present invention.

The magnetic disk drive 10 is constructed by the following: a CPU 11; memories such as ROM 12 and RAM 13; a hard disk controller (HDC) 15 that controls the data signal to be stored provided by a computer (PC) 14; a buffer (Buffer RAM) 16 that temporarily stores the data signal; a read/write channel IC (RDC) 17 that modulates and write-compensates for the data signal; a head amp IC (HDIC) 18 that converts the data signal into a current signal; a magnetic disk 21 rotated by a spindle motor 20 controlled by a motor driver IC (SVC) 19; a magnetic head 23 that is moved to a desired position by a voice coil motor (VCM) 22 and records data by converting the current signal into a magnetic field; and a data bus to which the above components are connected.

Data written on the magnetic disk 21 are read by the magnetic head 23, and are demodulated by the RDC 17. After error correction by the HDC 15, the data are transmitted to the PC 14.

The CPU 11 determines where on the magnetic disk 21 the data signal provided by the PC 14 is to be stored. The process of the above determination is specifically described below.

The magnetic disks 21 are provided with corresponding magnetic heads 23, and are identified by the identification numbers of the magnetic head 23. The recording region of each magnetic disk 21 is divided into "cylinders" where each cylinder is a circle of the same radius on all the magnetic disks 21, and each cylinder is divided into "sectors" that are arcs of the same predetermined angle on each magnetic disk 21. Cylinders and sectors are numbered. A sector of a cylinder on a magnetic disk 21 can be uniquely identified by the Cylinder number, the Head number, and the Sector number (hereinafter, referred to as "CHS").

Figure 2:
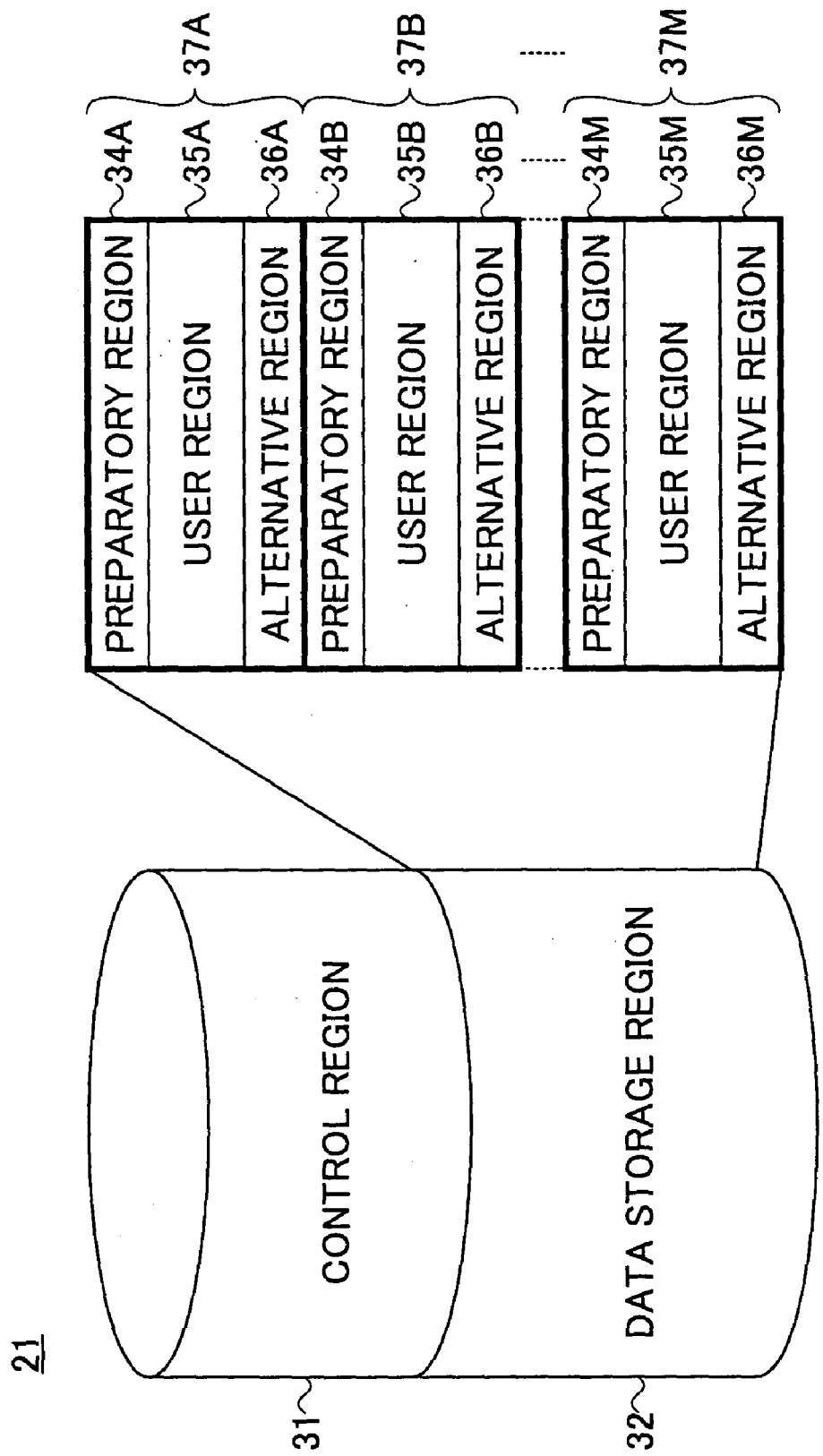
FIG. 2 is a schematic diagram showing the configuration of a magnetic disk according to an embodiment.

FIG. 2 is a schematic diagram showing a magnetic disk 21 according to the embodiment. The magnetic disk 21 is constructed by a control region 31 provided at the top of the magnetic disk 21, and a data storage region 32 provided after the control region 31. The control region 31 is used for storing a program of the present invention, a defect control table to be described later, and a relocation processing control table. The data storage region 32 is further constructed by a plurality of zones 37A through 37M, each provided with a preparatory region 34, a user region 35, and an alternative region 36 in this order. The preparatory region 34 is used as preparatory sectors that backup (replace) initial defect sectors found in initializing processing performed in an outgoing inspection at the factory. The unused portion of the preparatory region 34 is used later for relocating processing. In the case that a sector becomes defective after shipment from the factory and the relocating processing is performed, the user data of the defective sectors in the user region 35 are relocated so as to improve transfer speed. In this case, sectors in the preparatory region 34 that are the same in number as the defective sectors in the user region 35 are used for the relocation of the user region 35. The user region 35 is used by users to store their data. Data received from the PC 14 are stored in the user region 35, and data reproduced from the user region 35 are transferred to the PC 14. The alternative region 36 is used as alternative sectors to which the user data of the posteriori defective sectors in the user region 35 are initially relocated (are alternated).

Serial numbers are assigned to the sectors in the preparatory region 34 and the user region 35. For example, the serial numbers continue in the following order: the preparatory region 34A and the user region 35A of the first zone 37A, the preparatory region 34B and the user region 35B of the zone 37B, . . . , the user region 35M of the last zone 37M. The serial numbers are referred to as Ideal Logical Block Address (ILBA). ILBA corresponds to CHS. If an ILBA is designated, a corresponding CHS can be identified. ILBAs are assigned to the sectors of the preparatory region 34 and the user region 35 so that the waiting time and the seek time of the head 23 are minimized.

Serial numbers called Alternative sector Numbers (ALN) are assigned to the sectors in the alternative region 36. ALN also corresponds to CHS.

A method of assigning the logical block address (LBA) according to an embodiment is described below.

Figure 3:
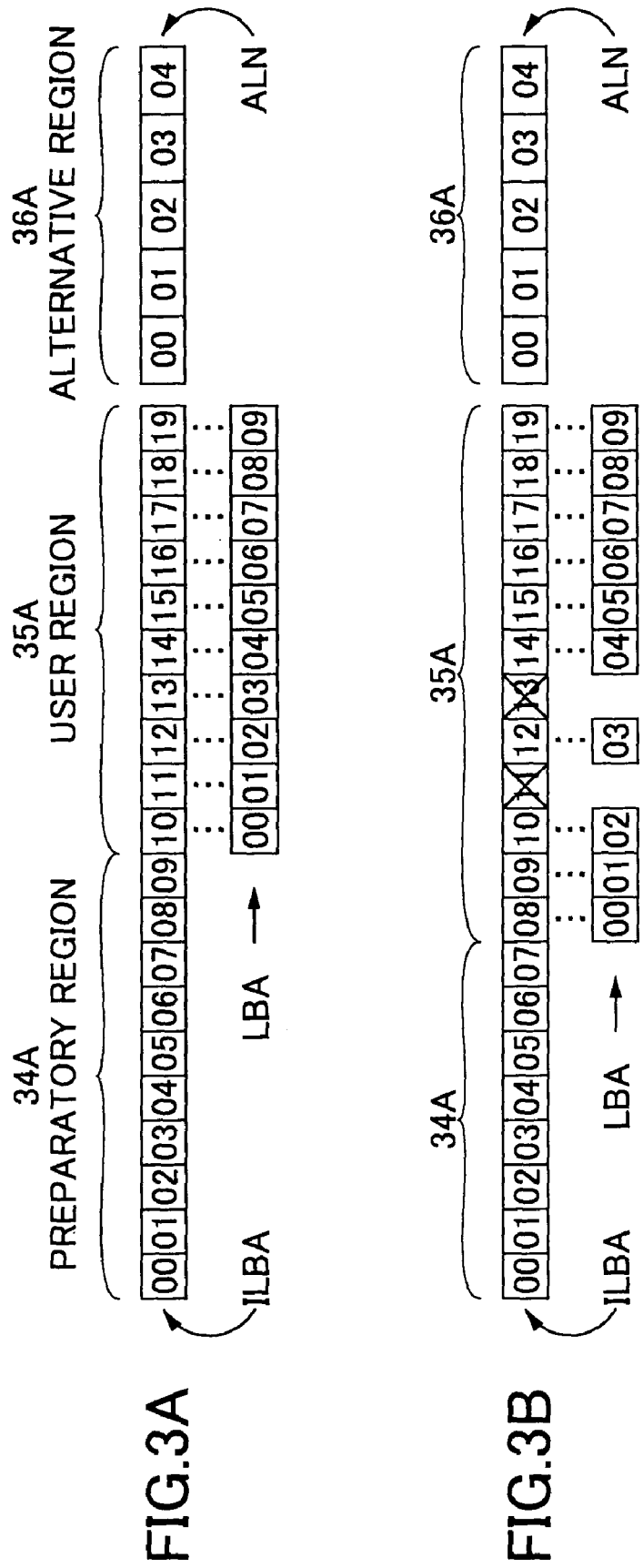
FIGS. 3A and 3B are schematic diagrams showing the relationship between logical block addresses and ideal logical block addresses assigned in initial processing according to an embodiment.

FIGS. 3A and 3B are schematic diagrams showing the relationship between LBA and ILBA assigned by initializing processing. One zone 37A of the data storage region is shown in FIGS. 3A and 3B. It is assumed that the LBA of the first sector of the preparatory region is "00" to make the description easy. In initializing processing, the magnetic disk apparatus 10 performs the following operations: writing servo signals on the magnetic disk 21, recording cylinders and sectors, reserving a memory region for the tables in the control region, and identifying defective sectors.

FIG. 3A shows the case in which no initial defective sector is found in the zone 37A in the initializing processing before shipment from the factory. As is shown in FIG. 3A, the zone 37A is constructed by the preparatory region 34A consisting of 10 sectors, the user region 35A consisting of 10 sectors, and the alternative region 36A consisting of 5 sectors. ILBA 00–19 are assigned to the preparatory region 34A and the user region 35A. Since no defective sector is found in the user region 35A in the initializing processing, ILBA 00–09 are assigned to the preparatory region 34A, and ILBA 10–19 are assigned to the user region 35A. That is, LBA00 is assigned to ILBA10 that is the top of the user region 35A, and LBAs are assigned to the remaining ILBAs in the order of ILBAs. ALN 01–04 are assigned to the alternative region 36A.

An initial defective sector is a sector that is found defective in the initializing processing. In the initializing processing, if the magnetic disk apparatus 10 writes data in the sector for a predetermined number of times, but it cannot reproduce the data written in the sector for a predetermined number of times, for example, the sector is classified as an initial defective sector. A sector becomes defective due to physical defects on the magnetic disk 21 such as scratches and dimples that degrade signal output and/or signal-to-noise ratio.

If a sector is found defective in the initializing processing before the shipment from the factory, no LBA is assigned to the initial defective sector.

FIG. 3B shows the case in which two sectors ILBA11 and ILBA13 are found initially defective. The initial defective sectors ILBA11 and ILBA13 are crossed in FIG. 3B. The top of the user region 35A is shifted by the number of defective sectors (two sectors in this case). That is, LBA00 is assigned to ILBA08. No LBA is assigned to the initial defective sectors ILBA11 and ILBA13. LBA09 is assigned to ILBA19. Accordingly, the preparatory region 34A consists of ILBA00–ILBA07, and the user region 35A consists of ILBA08–ILBA19. The ILBAs of the initial defective sectors (ILBA11 and ILBA13 in this case) are stored in a defect control table as the information about the initial defective sectors.

When the PC 14 requests the magnetic disk apparatus 10 to store data, the CPU 11 of the magnetic disk apparatus 10 calculates the CHS (physical position) of usable sectors based on both the ILBAs of defective sectors stored in the defect control table in the control region 31 and the relationship between ILBA and LBA in the case that no defective sector exists. The magnetic head 23 moves to the calculated CHS and records the data obtained from the PC 14. Since the defective sectors are skipped based on the information stored in the defect control table, the data are not recorded in the defective sectors. Accordingly, the magnetic disk apparatus can improve the reliability of stored data.

A method of handling posteriori defective sectors that become defective after initializing processing is described below.

Figure 4:
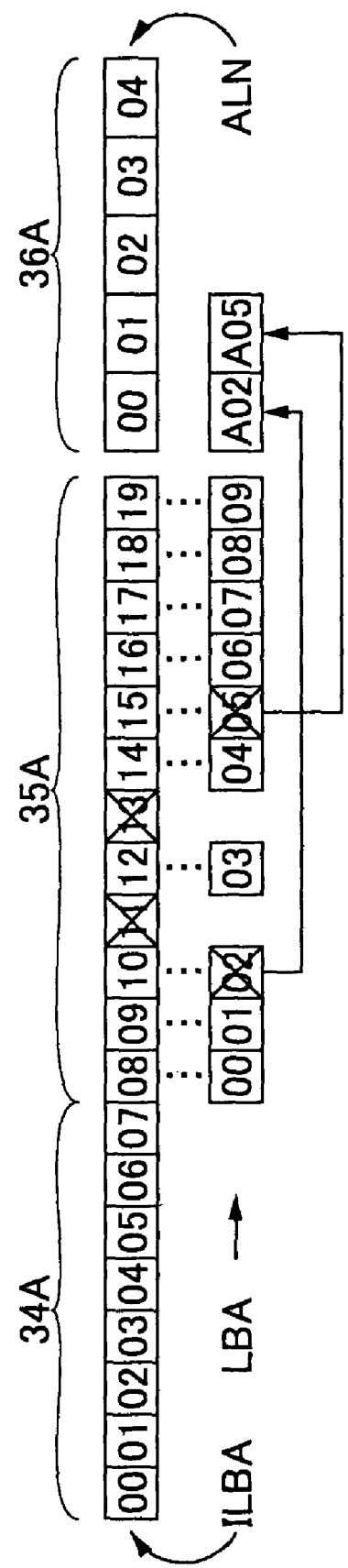
FIG. 4 is a schematic diagram showing the alternating processing of posteriori defective sectors according to an embodiment.

FIG. 4 is a schematic diagram showing the case in which posteriori defective sectors are alternated (recorded in the alternative region). FIG. 4 shows the case in which, after two initial defective sectors are found as shown in FIG. 3B, two additional defective sectors are found.

As showed in FIG. 4, LBA02 (ILBA10) and LBA05 (ILBA15) are found defective (LBAs of the defective sectors are crossed). The magnetic disk apparatus 10 alternates the user data stored in the defective sectors so as not to lose the user data. In the alternating processing, the user data stored in the defective sectors are moved to sectors in the alternative region, and the LBAs of the defective sectors and the LBAs of the sectors in the alternative region are correlated. As showed in FIG. 4, the defective sector LBA02 is alternated with ALN00 (A02), and the defective sector LBA05 is alternated with ALN01 (A05). An alternating processing table for correlating a defective sector and corresponding alternative sector is prepared in the control region 31, for example. The user data stored in the defective sector are moved to the alternative sector by the alternating processing, and the magnetic disk apparatus 10 avoids losing the user data and maintains its reliability.

When the PC 14 requests the magnetic disk apparatus 10 to store data, the CPU 11 reads the information of alternative sectors from the alternating processing table stored in the control region 31, calculates CHS, that is, the physical position based on the information about defective sectors stored in the defect control table, and causes the magnetic head 23 to access the alternative sectors.

The magnetic head 23 reads and writes data in the order of LBA. If the alternating process is executed, and as a result, the user region and the alternative region are distant, the magnetic head wastes seek time and rotational waiting time, which results in degrading the data transfer speed.

In this case, the magnetic head 23 needs to access in the following order: sectors LBA00 and LBA01 in the user region 35A, a sector ALN00 (A02) in the alternative region 36A, sectors LBA03 and LBA04 in the user region 35A, a sector ALN01 (A05) in the alternative region 36A, and sectors LBA06–LBA09 in the user region 35A. The more alternative sectors used, the more time the magnetic head 23 requires to move between the user region 35A and the alternative region 36A, which lowers the data transfer speed. Accordingly, the CPU 11 of the magnetic disk apparatus 10 monitors the alternating processing table, and if the number of alternated sectors exceeds a predetermined number, the CPU 11 executes relocating processing.

Figure 5:
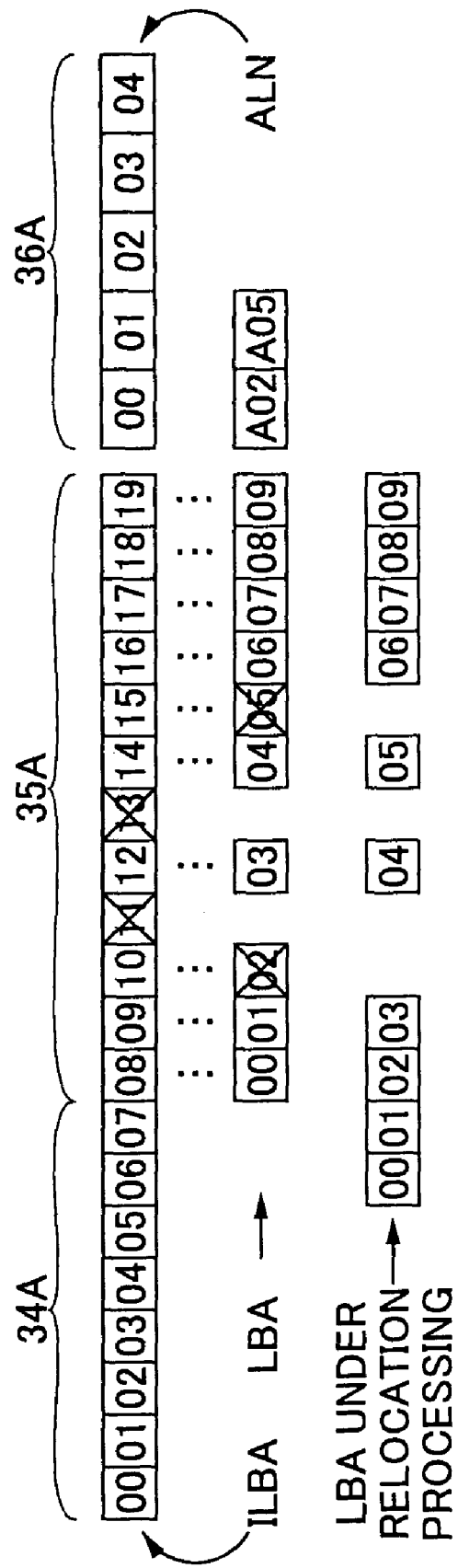
FIG. 5 is a schematic diagram showing the relocating processing of sectors showed in FIG. 4.

FIG. 5 is a schematic diagram showing the case in which sectors of FIG. 4 are relocated. As is shown in FIG. 5, sectors are relocated so that the two alternated sectors and the other user sectors that are not alternated are sequenced in the order of LBA, using a continuous array (ILBAs) of undamaged sectors.

Two sectors, which are equal in number to the alternative sectors, are reserved in the preparatory region 34A. These sectors are the last two sectors in the preparatory region 34A next to the top of the user region 35A. Accordingly, since LBA00 indicating the top of the user region 35A is assigned to ILBA08 before the relocating processing, two sectors ILBA06 and ILBA07 are reserved for the relocating processing, and the LBA00 is assigned to ILBA06 after the relocating processing. LBAs are assigned in the order of ILBAs starting with ILBA06. The user data are moved in accordance with LBA. Accordingly, the magnetic head 23 can read and write data in the order of the relocated LBA. The seek time and rotation waiting time are minimized, and therefore, the data transfer rate is improved.

The relocation control table is prepared in the control region 31 to control the relocating processing.

FIG. 6 illustrates the relocation control table. As showed in FIG. 6, the relocation control table 40 stores either ILBA or ALN, if alternated, before and ILBA after the relocating processing corresponding to each LBA. The CPU 11 executes relocating processing based on the information stored in the relocation control table.

After all the alternative sectors (user data) are relocated by relocating processing, the alternating processing table is updated. The user data stored in ALN00 and ALN01 in the alternative region 36A may be deleted because they are no longer necessary. The "before" information may be deleted from the relocation control table 40 too.

When the PC 14 requests the magnetic disk apparatus 10 to store user data, the CPU 11 calculates the CHS of the sector corresponding to the LBA designated by the PC 14 based on the information about the defective sectors and the alternative sectors stored in the control region 31 and the relationship between ILBA and LBA. The magnetic head 23 accesses the designated sector. The LBAs are assigned to the sectors by the relocating processing so that the seek time of the magnetic head 23 becomes minimum, and consequently, the data transfer speed is improved. Additionally, the magnetic disk apparatus 10 can prevent the magnetic head 23 from accessing the defective sectors, which improves the reliability of the magnetic disk apparatus.

The relocating processing may be executed at fixed intervals, or in response to reception of a request from the PC 14, instead of the case in which the number of alternated sectors exceeds a predetermined number. Recent magnetic disk apparatuses have large capacities of more than 50 GB and it takes a long time to complete relocating processing. If relocating processing is executed periodically, the transfer rate of the magnetic disk apparatuses can be maintained or even improved.

An error may occur during relocating processing.

FIGS. 7A and 7B are schematic diagrams showing the case in which an error occurs during relocating processing. FIG. 7A shows the case in which, while the sectors are relocated as showed in FIG. 5, a write error occurs at the sector LBA04 that is under relocating processing. In this case, alternating processing is executed to avoid losing the user data in the sector LBA04. Since ALN00 and ALN01 are still in use, ALN02 is used as the alternative sector (A04) of LBA04, and the user data in LBA04 are moved to ALN02. The information is stored in the defect control table and the alternating processing control table.

As is shown in FIG. 7B, the relocating processing is continued from LBA05 for the remaining sectors, and the user data are moved accordingly.

As described above, if an error occurs or a defective sector is found during the relocating processing, the sector is alternated, and the remaining sectors to be relocated are relocated to the end. According to this method of relocating sectors, alternative sectors still remains, but the number of the alternative sectors is reduced compared with the number before the relocating processing. Accordingly, it is possible to reduce the seek time of the magnetic head 23, for example, and to improve the transfer rate.

The relocating processing may be suspended due to power failure, for example. FIG. 7A also illustrates the case in which, while LBA04 is in relocating processing, power fails. Even in this case, as is shown in FIG. 7A, all the user data to be relocated are retained in the magnetic disk 21 at the time of the occurrence of the power failure. That is, LBA00–LBA03 are retained in ILBA06–ILBA09; LBA04 is retained in ILBA14, LBA05 is retained in ALN01 in the alternative region 36A; and LBA06–LBA09 are retained in ILBA16–ILBA19. Accordingly, it is possible to continue the relocating processing after the power failure, and to protect the user data from being lost. The user data are retained safely. The magnetic disk apparatus according to this embodiment can sustain high reliability.

The steps of the present invention are described with reference to flow charts below.

FIG. 8A is a flow chart showing the steps of the relocating method according to this embodiment. As is shown in FIG. 8A, in step S101, a determination whether previous relocating processing has been completed normally is made by checking the state of a flag. If the flag is "0", which indicates that the previous relocating processing has been completed normally, the next step S102 is executed. If the flag is "1", suspension processing step S122 in FIG. 8B) is executed. The flag is stored in a predetermined position in the control region 31, for example, and is updated whenever the state changes.

In step S102, the flag is set at "1" to indicate that relocating processing has been started.

In step S103, the number of alternative sectors in the alternative region 36 in the zone 37 to be relocated is counted. Specifically, the number of sectors of which information is stored in the alternating processing control table in the control region 31 is counted. All sectors that are alternated are relocated. Accordingly, the number of seek operations of the magnetic head 23 can be reduced, and the transfer speed can be improved.

In step S104, ILBA corresponding to LBA00 before the relocating processing, that is, the top of LBA is calculated in order to determine the first sector to be accessed to read the user data. The calculation is made based on the information of defective sectors stored in the defect control table in the control region 31 and the relationship between LBA and ILBA in the case no defective sector exists.

In step S105, ILBA corresponding to the top of the new LBA after the relocating processing is calculated, and the calculated ILBA is stored in a predetermined position in the control region 31.

New LBAs are assigned, and the relocating processing control table is prepared. Specifically, the number of alternative sectors obtained in step S103 and ILBA of the top of LBA calculated in step S104 are used. That is, ILBA of the new LBA is L–m, where "L" is the ILBA of the top of LBA (LBA00), and "m" is the number of the alternative sectors. The writing operation of relocating processing starts with the sector corresponding to this ILBA. The new LBAs after the relocating processing are assigned from this ILBA, with the defective sectors being skipped, and the relocating processing control table showed in FIG. 6 is prepared.

In step S106, a position at which data are to be read is calculated. Specifically, the CHS corresponding to the ILBA calculated in step S104 is calculated. When the magnetic disk apparatus 10 is assembled, the relational expression between the ILBA and the CHS is stored in the control region 31 or the ROM 12.

In step S107, the user data stored in "n" (a predetermined number) sectors from the sector at the reading position in the direction in which LBA increases are read. Accordingly, if an alternative sector is included in the sectors to be read, the alternative sector is also read with the user sectors in the order of LBA. The predetermined number "n" is determined depending on the memory capacity of the buffer RAM 16 or the nonvolatile memory, for example. The predetermined number is preferred to be larger than the number of sectors in one track so as to reduce the time required for the relocating processing.

In step S108, the user data read in step S107 are stored in a memory such as the RAM 13 or the Buffer RAM 16 connected to HDC 15. In step S109, the user data are further saved in the nonvolatile memory. The nonvolatile memory means the control region 31 and a flash memory, for example. Since the user data read in step S107 are saved, even if relocating processing is coercively suspended, it is possible to recover the user data and continue the relocating processing.

In step S110, the CHS corresponding to the ILBA with which the writing position of new LBA is calculated in step S105 is calculated. The CHS can be calculated in the same manner as done in step S106.

In step S111, the user data stored in the memory in step S108 are written in the user sectors, the predetermined number of sectors (n) being written continuously, starting with the writing position calculated in step S107. After the user data are written, a determination whether the user data are written correctly is made. Defective sectors of which information is stored in the relocation processing control table are skipped. In step S112, if a predetermined number of writing errors occur, the user data are written in alternative sectors in the alternative region 36, and LBA and ILBA after the relocating processing are stored in the alternating processing control table.

As described above, if there is a sector in which writing error occurs, the magnetic disk apparatus 10 avoids the loss of user data by alternating processing. The alternating processing generates alternative sectors that degrade the transfer speed. This problem, however, is solved when the alternative sectors are relocated by resuming the relocating processing after the alternating processing. The transfer rate is improved in total. If defective sectors are additionally found in relocating processing, they can be relocated at the next opportunity.

In step S113, a determination whether all alternative sectors are moved is made based on the relocating processing control table 40. In step S114, if the move of the alternative sectors is not completed yet, the reading position and the writing position are updated and stored at a predetermined region in the control region 31. Specifically, the predetermined number of sectors ("n" sectors) is added to the reading position and the writing position. That is, the reading position before relocating processing is LBA00 (ILBA=L), the reading position after relocating processing is LBA=n (ILBA=L+n, in the case that no defective sector exists). In addition, the writing position before relocating processing is ILBA=L−m, the writing position after relocating processing is ILBA=L−m+n in the case that no defective sector exists). If there are defective sectors, the reading position and the writing position shift backward by the number of the defective sectors.

After step S114, control is returned to step S106, and the steps S106 through S113 are repeated. In step S115, if all alternative sectors are moved (S113), the flag is set at "0" indicating that relocating processing is successfully completed.

The relocating processing of one zone 37 is completed as described above. If there is a plurality of zones 37, the relocating processing (S101 through S115) is repeated for each of the remaining zones 37.

Relocating processing may be suspended due to power failure in step S104 through S110.

FIG. 8B is a flow chart showing suspending processing executed in the case in which relocating processing is suspended by power failure, for example. As is showed in FIG. 8B, in step S120, the state of the flag is determined. If the flag is set at "0", the relocating processing is already successfully completed, and the suspension processing is not executed. If the flag is set at "1", which means the relocating processing is not completed yet due to an error, the suspension processing is executed.

In step S122, the reading position and the writing position stored in the control region 31 are read. In step S123, the user data saved in the nonvolatile memory are transferred to the memory. Since the state before the suspension can be recovered using the above information, relocating processing can be resumed from step S110 showed in FIG. 8. Accordingly, even if relocating processing is suspended due to power failure, for example, it is possible to resume and complete the relocating processing after the suspension. The relocating processing according to this embodiment is efficient.

A variation of the above embodiment is described below. In the embodiment, the user data read in step S109 are saved in the nonvolatile memory. However, if the predetermined number of sectors ("n" sectors) is set less than the number of alternative sectors counted in step S103, step S109 may be omitted. That is, as showed in FIG. 9, in the case in which there are two alternative sectors A02 and A05, the sectors LBA00–LBA03 under relocating processing can be relocated by setting the predetermined number of sectors at two and repeating steps S106 through S114 twice. Even if relocating processing is suspended due to power failure while LBA04 and LBA05 are being written, the user data of LBA04 and LBA05 are retained in ILBA14 and ALN01. Accordingly, once the reading position and the writing position are read in step S122 of FIG. 8B, relocating processing can be resumed from step S106 of FIG. 8A. As a result, it is possible to save time required to save the user data (step S109) without sacrificing safety.

The present invention is not limited to these embodiments, but various variations and modifications may be made without departing from the scope of the present invention.

Although the present invention is described using the magnetic disk apparatus as an example, the present invention is applicable to any rewritable information storage apparatus that, if a sector is found defective after the shipment from the factory, alternates the posteriori defective sectors. The defect control table, the alternating processing control table, and the relocating processing table are provided in the control region 31 of the magnetic disk 21, or they may be provided in another nonvolatile memory in the magnetic disk apparatus 10, such as ROM 12 consisting of a flash memory showed in FIG. 1. Although, in the above description, the control region 31 is provided at the front side of the user storage region 32, the control region 31 may be provided at the back side, or even at both sides, of the user storage region 32. The control region 31 may be provided on each face of the magnetic disk 21. Although relocating processing as explained above is executed by sector, it may be executed by cylinder or track.

As is apparent from the above description, in a magnetic disk apparatus according to an embodiment of the present invention, the user sectors and the alternative sectors are rearranged over the preparatory region and the user storage region in the order of the logical block addresses. Accordingly, the seek operations of the magnetic head can be minimized, and the transfer rate can be improved. Additionally, since the user data to be relocated are written in sectors in front of the previous sectors, even if writing user data is suspended due to power failure, for example, the user data are retained in the magnetic disk. Accordingly, the user data can be recovered after the power failure, for example, and relocating processing can then be resumed, which ensures reliability, safety, and efficiency of relocating processing.

Additionally, since the alternative region is provided contiguous to the user region, if the user data are moved to the alternative sectors due to the occurrence of posteriori defective sectors, the magnetic head can access the alternative sectors quickly, and the decrease in transfer rate is minimized.

The present invention is not limited to these embodiments, but various variations and modifications may be made without departing from the scope of the present invention.

This patent application is based on Japanese priority patent application No. 2002-264262 filed on Sep. 10, 2002, the entire contents of which are hereby incorporated by reference.

What is claimed is:

1. An information storage apparatus, comprising a recording medium including:
   a user region having a plurality of user sectors, logical block addresses being assigned thereto, in which user data are stored;
   an alternative region having an alternative sector, in which user data of a posteriori defective user sector are stored; and
   a preparatory region provided at the front side of said user region, having a plurality of preparatory sectors that are used when the user sectors and the alternative sectors are relocated,
   wherein
   the user sectors storing user data of the posteriori defective user sectors in the alternative region and the user sectors other than the posteriori defective user sectors in the user region are relocated over the preparatory region and the user region in the order of the logical block addresses; and
   the user data are moved to the relocated sectors.

2. The information storage apparatus as claimed in claim 1, wherein the alternative region is located contiguous to the user region.

3. A method of relocating sectors of an information recording medium, including:
   a user region having user sectors, logical block addresses being assigned thereto, in which user data are stored;
   an alternative region having alternative sectors, in which user data of posteriori defective user sectors are stored; and
   a preparatory region provided at the front side of said user region, having preparatory sectors that are used when the user sectors and the alternative sectors are relocated,
   comprising the steps of:
   (1) counting the number of the alternative sectors;
   (2) assigning new logical block addresses to sectors starting with the sector of the counted number in front of the top of the user region, the posteriori defective sectors being skipped;
   (3) reading user data stored in sectors of a predetermined number in the direction in which the logical block addresses increase;
   (4) writing the user data read in the step (3) in the direction in which the new logical block addresses increase; and
   (5) repeating the steps (3) and (4) until the user data of all alternative sectors are moved.

4. The method as claimed in claim 3, further comprising the step of saving the user data read in the step (3) in a nonvolatile memory.

5. The method as claimed in claim 3, wherein, if a new defective sector is found while the user data are being written, the user data of the defective sector are stored in the alternative region.

6. The method as claimed in claim 3, wherein the predetermined number does not exceed the number of alternative sectors.

7. The method as claimed in claim 3, wherein the steps are executed in one or more of a case in which the number of alternative sectors reaches a predetermined number, a case in which a predetermined time passes after a previous relocating processing is executed, and a case in which a request from an upper rank apparatus is received.

8. The method as claimed in claim 3, wherein, in initializing processing, logical block addresses are assigned sectors other than initial defective sectors.

* * * * *